United States Patent [19]

Redondo-Abad et al.

[11] 4,266,972

[45] May 12, 1981

[54] PROCESS FOR NON-FERROUS METALS PRODUCTION FROM COMPLEX SULPHIDE ORES CONTAINING COPPER, LEAD, ZINC, SILVER AND/OR GOLD

[76] Inventors: Angel L. Redondo-Abad; Eduardo Diaz-Nogueira; Martin Gerez-Pascual; José M. Regife-Vega, all of Madrid, Spain

[21] Appl. No.: 103,807

[22] Filed: Dec. 14, 1979

[30] Foreign Application Priority Data

Dec. 15, 1978 [ES] Spain .................................... 476.055

[51] Int. Cl.$^3$ ...................... C22B 19/22; C22B 15/08; C22B 11/04; C22B 13/04
[52] U.S. Cl. ........................................ 75/101 R; 75/2; 75/109; 75/114; 75/115; 75/117; 75/118 R; 75/120; 423/36; 423/41; 423/100; 204/119
[58] Field of Search ..................... 75/101 R, 115, 114, 75/2, 109, 117, 118 R, 120; 423/36, 41, 100; 204/119

[56] References Cited

U.S. PATENT DOCUMENTS

| | | | |
|---|---|---|---|
| 3,923,976 | 12/1975 | Vega et al. | 423/99 |
| 3,957,602 | 5/1976 | Johnson et al. | 204/106 |
| 3,961,941 | 6/1976 | Baker et al. | 75/101 R |
| 4,011,146 | 3/1977 | Coltrinari et al. | 75/120 X |
| 4,063,933 | 12/1977 | Peters | 75/115 X |
| 4,113,471 | 9/1978 | Langhorst et al. | 75/118 R X |

Primary Examiner—G. Ozaki
Attorney, Agent, or Firm—Pollock, Vande Sande and Priddy

[57] ABSTRACT

Metal sulphide ore is leached by water under a low pressure and oxidizing atmosphere to dissolve zinc and copper, hydrolyze iron to hematite, and leave lead and precious metals as insoluble sulphates. The residue is leached by sodium chloride and calcium chloride to dissolve lead and the precious metals.

16 Claims, No Drawings

PROCESS FOR NON-FERROUS METALS PRODUCTION FROM COMPLEX SULPHIDE ORES CONTAINING COPPER, LEAD, ZINC, SILVER AND/OR GOLD

This patent of invention application relates to the hydrometallurgical treatment of pyrite based complex sulphide ores in order to obtain the non-ferrous metals they contain and, more specifically, to the process for the extraction of copper, zinc, lead, silver and gold.

All over the world there are abundant reserves of complex sulfides with small grades of copper, zinc, lead, silver, gold, etc. The traditional method of utilizing said ore is differential flotation to produce individual concentrates of the metals and their subsequent treatment by the conventional pyrometallurgical methods.

This process requires reaching in grinding the liberation size of all the mineralogical species, which is in many cases below the necessary minimum particle size for their flotation in conventional machines.

Moreover, the differentiation of the metals in independent circuits, with their respective yields, limits the total yield of the process.

Furthermore, the pyrometallurgical processes for treating said concentrates present a problem of environmental pollution because of the emissions of sulfurous anhydride. Many of the proposed methods for controlling said emissions are based on conversion of the sulfurous anhydride into sulfuric acid. However, even if an economically feasible method for converting the sulfurous anhydride into sulfuric acid were found, the production of large amounts of sulfuric acid would present an additional pollution problem.

The process subject of this invention is preferentially applied to bulk flotation concentrates. The bulk flotation of the non-ferrous species is feasible with a grinding rate reaching the liberation size of the pyrite. Moreover, the recovery of the metals is carried out in a single operation with the ensuing increases in yields. The pattern for working pyrite complexes by bulk flotation consists in obtaining a single concentrate with non-ferrous metals, with a low pyrite content, less than 30%, without seeking high grades in the non-ferrous metals.

Moreover, the bulk flotation pattern is performed with reasonable grinding from the economic point of view. The recovery yields of non-ferrous metals in the bulk concentrate are usually 15 to 25% higher than in differential flotation.

There is a series of processes for recovering the non-ferrous metals contained in the bulk flotation concentrates. Among them, prominent reference can be made to leaching with a ferric chloride solution, leaching with a cupric chloride solution, leaching in a diluted sulfuric medium under oxidizing conditions at temperatures below those of the melting point of sulfur, etc.

This invention is essentially based on two fundamental steps.

The object of the first step, leaching in an aqueous medium at a temperature above that of the melting point of sulfur and at low pulp density, is to solubilize practically all the copper and zinc of the bulk concentrate, hydrolyze the iron in the form of hematite, to obtain a fertile copper and zinc liquid with a low sulfuric acid content and an iron concentration of less than 1 g/l suitable for recovering the copper and zinc by solvent extraction and electrolysis or by cementation, and concentrate the lead, silver and gold in the solid. The object of the second step, leaching of the residue containing the lead, the silver and the gold with a sodium chloride-calcium chloride solution, is to solubilize practically all the lead, silver and gold, obtain a fertile lead, silver and gold liquid suitable for cementation with scrap zinc, remove the hematite residue and utilize the zinc and sodium chloride of the cementation effluent by incorporating it to zinc recovery by solvent extraction.

The first leaching step consists in the dispersion of the bulk concentrate in water to form a slurry with a fixed and controlled solid-liquid ratio and subsequent oxidization of the slurry with an oxygen-containing gas in a pressure-agitated reactor.

The slurry density is adjusted according to the composition of the concentrate so that the free acidity when the leaching ends is less than 50 g/l of sulfuric acid, which allows to obtain a fertile liquid with less than 1 g/l of iron. The maximum amount of sulfuric acid which can be produced is that corresponding to the oxidization of the sulfur of the pyrite and half of the sulfur of the chalcopyrite. To define said slurry density a value is set so that the ratio of total iron in the solid phase to water is less than 20 kg per cubic meter.

The temperature of the reaction should be maintained between 150° and 250° C. and preferably at 200°±10° C.

The pressure is adjusted taking into account that it is necessary to maintain a partial oxygen pressure above 5 kg/cm² g and preferably 12±2 kg/cm² g.

The gas preferably used in the reaction is oxygen, although it is also possible to use air and oxygen-enriched air.

The agitation level of the reaction has to be intense, so that the dispersion of the oxidizing gas phase into the liquid phase is achieved, forming a sufficiently large gas-liquid interface surface to prevent the dissolution of the oxygen in the liquid from being the controlling step from the kinetic point of view.

The gas-liquid transfer coefficient has to be at least 100 hr$^{-1}$.

The reaction times necessary to complete the oxidization reaction of sulfides to sulfates and the hydrolysis of the dissolved iron to ferric oxide are placed at a minimum of 45 minutes, the preferable value being 60 minutes. Therefore, the residence time in the reactor will be the equivalent of the mentioned reaction time.

The following chemical reactions take place under these conditions:

$$2CuFeS_2 + 8.5O_2 + H_2SO_4 \rightarrow 2CuSO_4 + Fe_2(SO_4)_3 + H_2O$$

$$2FeS_2 + 7O_2 + 2H_2O \rightarrow 2FeSO_4 + 2H_2SO_4$$

$$PbS + 2O_2 \rightarrow PbSO_4$$

$$ZnS + 2O_2 \rightarrow ZnSO_4$$

$$2FeSO_4 + H_2SO_4 + \tfrac{1}{2}O_2 \rightarrow Fe_2(SO_4)_3 + H_2O$$

$$Fe_2(SO_4)_3 + 3H_2O \rightarrow Fe_2O_3 + 3H_2SO_4$$

In this manner, both the copper and the zinc can be solubilized in the aqueous medium with a yield of more than 98%.

The lead and the noble metals remain in the solid residue, accompanied by the ferric oxide which is formed, as a result of the last reaction, by hydrolysis of the ferric sulfate. Said ferric oxide is very crystalline and therefore easy to settle and filtrate.

The fertile copper and zinc liquid has an iron concentration of less than 1 g/l.

The leaching pulp, after being cooled to 60° C. and its working pressure having been reduced to atmospheric pressure, is sent to the solid-liquid separation unit consisting in a thickening and filtration with washing in the filter itself. The filtered liquid, together with the washing liquid, are incorporated in the thickening step and the solid is subsequently processed to recover the lead and the noble metals.

The effluent resulting from this solid-liquid separation is neutralized with ground limestone, to a pH value comprised between 1.5 and 2.5, preferably 2.0.

On being neutralized with limestone, the sulfuric acid contained in the fertile liquid produces a solid phase principally formed by gypsum. Once filtered and washed, said solid phase constitutes the principal solid residue of the process.

Moreover, the filtrate is a completely suitable liquid for recovering the copper either by cementation with scrap iron or by extraction with selective organic solvents and subsequent electrolysis.

The residue leaching step consists in the dispersion of the solid in a sodium chloride-calcium chloride solution.

This step is based on the capacity of forming complexes in a concentrated chloride medium of the lead, silver and gold ($PbCl_3{}^-$, $AuCl_4{}^-$, $Ag_2Cl^+$, $Ag_3Cl^{2+}$).

The aqueous leaching solution should contain a sodium chloride concentration comprised between 200 and 300 g/l and a calcium chloride concentration corresponding to the amount stoichiometric to the lead present. This calcium chloride concentration makes the sulfate corresponding to the lead precipitate, as calcium sulfate, increasing the solubility of the lead in the leaching brine.

Moreover, ferric chloride in a concentration of 1 g/l is initially added to the leaching solution in order to increase the redox potential of the solution and thus prevent the reduction of the silver to its metallic state.

The pH of the solution is adjusted to a value below 7.0, preferably 1.0, in order to prevent hydrolysis.

The temperature of the reaction should be maintained above 60° C. and preferably at 85°±5° C.

The agitation level should be normal and the necessary reaction times have to be at least 15 minutes and preferably 30±10 minutes. The residence time in the reactors is equivalent to the mentioned reaction time.

The pulp density is adjusted to such a value that the solution produced contains a lead concentration below the maximum solubility of said metal in the concentrated solution of chlorides.

The following chemical reactions take place under these conditions:

$$PbSO_4 + 3NaCl \rightarrow Na_2SO_4 + NaPbCl_3$$

$$PbSO_4 + CaCl_2 + NaCl \rightarrow CaSO_4 + NaPbCl_3$$

$$Ag_2SO_4 + 2NaCl \rightarrow Na_2SO_4 + Ag_2Cl_2$$

$$3Ag_2SO_4 + 6NaCl \rightarrow 3Na_2SO_4 + 6AgCl$$

$$Au_2(SO_4)_3 + 8NaCl \rightarrow 3Na_2SO_4 + 2NaAuCl_4$$

In this manner, both the lead and the silver and the gold are solubilized in the aqueous medium with a yield of more than 98%.

The leaching residue is separated from the fertile liquid by thickening and/or filtration with washing, at a temperature above 60° C. The residual solid is ferric oxide and the liquid is a solution of lead, silver and gold suitable for recovering said metals by cementation with metallic zinc.

The effluent from the cementation of the lead and the noble metals is a solution principally comprising zinc and sodium chloride. In order to recover both components, said solution is sent, totally or partially, to a chloride concentration adjustment step which is carried out with the aqueous zinc solution resulting from the recovery of the copper.

The resulting mixture should be adjusted to a chloride concentration exceeding 30 g/l, preferably 60±10 g/l, being in suitable conditions to recover the zinc by anionic ion-exchange processes or solvent extraction and final electrolysis (Spanish Pat. Nos. 403.506 and 405.759 and U.S. Pat. No. 3,923,976).

Some non-limitative examples of each of the fundamental steps of the Patent of Invention are given below.

The examples combine laboratory tests and pilot plant tests and will serve to clearly define the process parameters of this invention.

EXAMPLE 1

| Parameter: | Slurry density |
|---|---|
| Equipment: | Autoclave (4 liters) |
| Agitation rate: | 1500 rpm |
| Reaction time: | 60 mins |
| Temperature: | 220° C. |
| Oxygen Partial Pressure: | 18 kg/cm² g |
| Concentrate Composition: | |
| | Cu: 11.18% |
| | Zn: 26.00% |
| | Pb: 4.92% |
| | Fe: 20.80% |
| | K$_{90}$ = 325 Tyler mesh |

The results obtained are summarized in Table 1.

TABLE 1

| Test No. | Slurry density $\frac{gr\ solid}{cm^3\ H_2O} \times 100$ | Copper extraction % | Zinc extraction % | Iron extraction % | Iron concentration g/l | Sulfuric Acid concentration g/l |
|---|---|---|---|---|---|---|
| 1 | 5 | 98.0 | 99.1 | 3.1 | 0.2 | 25.1 |
| 2 | 20 | 97.5 | 99.2 | 33.3 | 13.6 | 58.8 |

As is seen, on increasing the slurry density the proportion of iron dissolved increases and the percentage of copper dissolved drops slightly.

EXAMPLE 2

| Parameter: | Slurry density |
|---|---|
| Equipment: | Autoclave (4 liters) |
| Agitation Rate: | 1500 rpm |
| Reaction Time: | 60 mins |
| Temperature: | 200° C. |
| Oxygen Partial Pressure: | 9 kg/cm² g |
| Concentrate Composition: | |

Cu: 11.18%
Zn: 26.00%
Pb: 4.92%
Fe: 20.80%
K$_{90}$ = 325 Tyler mesh

The results obtained are summarized in Table 2.

TABLE 2

| Test No. | Slurry density $\frac{gr\ solid}{cm^3\ H_2O} \times 100$ | Copper extraction % | Zinc extraction % | Iron extraction % | Iron concentration g/l | Sulfuric Acid concentration g/l |
|---|---|---|---|---|---|---|
| 1 | 10 | 98.0 | 98.7 | 4.3 | 0.8 | 45.8 |
| 2 | 15 | 95.8 | 98.2 | 21.6 | 6.6 | 56.4 |

The consequences deduced are identical to example 1. On increasing the slurry density there is a notable increase in the percentage of iron dissolved and a reduction in that of copper.

EXAMPLE 3

| Parameter: | Oxygen partial pressure |
|---|---|
| Equipment: | Autoclave (4 liters) |
| Agitation Rate: | 1500 rpm |
| Slurry Density: | 10% |
| Reaction Time: | 20 mins |
| Temperature: | 200° C. |
| Concentrate Composition: | |
| | Cu: 16.60% |
| | Zn: 16.50% |
| | Pb: 4.75% |
| | Fe: 23.10% |
| | K$_{90}$ = 325 Tyler mesh |

The results obtained are given in Table 3.

TABLE 3

| Test No. | Oxygen partial pressure kg/cm² g | Copper extraction % | Zinc extraction % | Iron extraction % | Iron concentration g/l | Sulfuric Acid concentration g/l |
|---|---|---|---|---|---|---|
| 1 | 5.0 | 72.1 | 95.6 | 2.6 | 0.6 | 15.4 |
| 2 | 9.0 | 76.2 | 95.3 | 4.4 | 1.1 | 19.1 |
| 3 | 18.0 | 76.2 | 95.5 | 8.8 | 2.0 | 18.1 |

As can be seen, the increase in pressure favours dissolution of iron, only slightly affects dissolution of copper and practically does not affect dissolution of zinc, under the conditions in which the tests were carried out.

EXAMPLE 4

| Parameter: | Temperature |
|---|---|
| Equipment: | Autoclave (4 liters) |
| Agitation Rate: | 1500 rpm |
| Slurry Density: | 10% |
| Reaction Time: | 60 mins |
| Oxygen partial Pressure: | 18 kg/cm² g |

| Concentrate Composition: | |
|---|---|
| | Cu: 16.60% |
| | Zn: 16.50% |
| | Pb: 4.75% |
| | Fe: 23.10% |
| | K$_{90}$ = 325 Tyler mesh |

The results obtained are given in Table 4.

TABLE 4

| Test No. | Temperature °C. | Copper extraction % | Zinc extraction % | Iron extraction % | Iron concentration g/l | Sulfuric Acid concentration g/l |
|---|---|---|---|---|---|---|
| 1 | 175 | 66.4 | 94.7 | 4.8 | 1.1 | 16.7 |
| 2 | 190 | 80.1 | 98.5 | 10.5 | 2.4 | 39.9 |
| 3 | 200 | 96.7 | 98.8 | 4.0 | 0.9 | 38.7 |

It can be observed that on increasing the temperature the extraction of all the metals increases, but the influence is much more notable in copper than in zinc or iron.

EXAMPLE 5

| Parameter: | Reaction time |
|---|---|
| Equipment: | Autoclave (4 liters) |
| Agitation Rate: | 1500 rpm |
| Slurry Density: | 10% |
| Temperature: | 200° C. |
| Oxygen Partial Pressure: | 5.0 kg/cm² g |

| Concentrate Composition: | |
|---|---|
| | Cu: 16.60% |
| | Zn: 16.50% |
| | Pb: 4.75% |
| | Fe: 23.10% |
| | K$_{90}$ = Tyler mesh |

The results obtained are given in Table 5.

TABLE 5

| Test No. | Reaction time minutes | Copper extraction % | Zinc extraction % | Iron extraction % | Iron concentration g/l | Sulfuric Acid concentration g/l |
|---|---|---|---|---|---|---|
| 1 | 20 | 72.1 | 95.6 | 2.6 | 0.6 | 15.7 |
| 2 | 40 | 97.1 | 98.7 | 8.6 | 1.8 | 36.8 |
| 3 | 60 | 98.0 | 98.5 | 6.3 | 1.4 | 39.5 |

It can be seen that the dissolution kinetics of zinc is much more rapid than the dissolution kinetics of copper. The percentage of iron dissolved initially increases with the reaction time and subsequently decreases as a result of the progress of the hydrolysis reaction.

EXAMPLE 6

| Parameter: | Concentrate grades |
| --- | --- |
| Equipment: | Autoclave (4 liters) |
| Agitation Rate: | 1500 rpm |
| Oxygen Partial Pressure: | 12 kg/cm$^2$ g |
| Temperature: | 200° C. |
| Composition and slurry Density: | |

| Test No. | Slurry Density % | Concentrate Grades | | | |
| --- | --- | --- | --- | --- | --- |
| | | Cu % | Zn % | Pb % | Fe % |
| 1 | 7.0 | 3.6 | 31.1 | 7.2 | 16.1 |
| 2 | 7.5 | 9.8 | 23.7 | 7.1 | 21.5 |
| 3 | 9.5 | 11.2 | 26.0 | 4.2 | 20.8 |

The results obtained are given in Table 6.

TABLE 6

| Test No. | Copper extraction % | Zinc extraction % | Iron concentration g/l | Sulfuric Acid concentration g/l |
| --- | --- | --- | --- | --- |
| 1 | 98.2 | 99.3 | 0.7 | 28.5 |
| 2 | 98.6 | 99.2 | 1.1 | 37.1 |
| 3 | 99.2 | 99.0 | 1.8 | 44.5 |

It can be seen that with the process it is possible to work with concentrate of different grades in metals and of different origin, as the results are very similar.

EXAMPLE 7

Parameter: Concentrate grades
Equipment: Compartmented reactor (800 liters)
The features of the tests and the results are given in Table 7.

TABLE 7

| OPERATIONAL CONDITIONS AND RESULTS | TESTS | | |
| --- | --- | --- | --- |
| | 1 | 2 | 3 |
| Running time (hrs) | 86 | 140 | 72 |
| Slurry flow rate (l/hr) | 408 | 433 | 425 |
| Residence time—(minutes) | 118 | 110 | 113 |
| Slurry density (%) | 9.0 | 8.5 | 7.0 |
| Concentrate grade (%) | | | |
| Copper | 2.32 | 3.13 | 4.30 |
| Zinc | 32.30 | 34.37 | 26.20 |
| Lead | 6.85 | 7.49 | 7.50 |
| Iron | 17.10 | 15.59 | 15.20 |
| Process temperature (°C.) | | | |
| Reactor inlet | 135 | 109 | 118 |
| 1st compartment | 204 | 205 | 201 |
| 2nd compartment | 224 | 221 | 217 |
| 3rd compartment | 233 | 211 | 208 |
| 4th compartment | 224 | 204 | 214 |
| 5th compartment | 222 | 206 | 220 |
| Total pressure (kg/cm$^2$) | 30.8 | 32.6 | 31 |
| Agitation rate (rpm) | 400 | 450–500 | 470–500 |
| Results of the process | | | |
| Concentration rate | 0.37 | 0.37 | 0.37 |
| Copper extraction (%) | 98.8 | 98.6 | 98.0 |
| Zinc extraction (%) | 99.2 | 99.1 | 98.9 |
| Iron in solution (g/l) | 0.43 | 0.15 | 0.35 |
| Acid in solution (g/l) | 43.4 | 31.7 | 24.20 |

It can be seen that the recoveries of copper and zinc and the concentration of iron in solution are in the same range as in the laboratory tests. Moreover, likewise optimum results are obtained with different concentrate grades.

EXAMPLE 8

This last example refers to the leaching of the residue containing the lead and the noble metals.
The features of the tests are as follows:

| Composition of the residue: | |
| --- | --- |
| | Pb: 17.10% |
| | Ag: 0.042% |
| | Zn: 1.26% |
| | Cu: 0.23% |
| | Fe: 42.00% |
| | Bi: 0.06% |
| Temperature: 80–90° C. | |

| Test No. | Agitation Time hr | Slurry Density % | Sodium chloride concentration g/l | pH | Ferric chloride concentration g/l |
| --- | --- | --- | --- | --- | --- |
| 1 | 6 | 5 | 240 | 0 | — |
| 2 | 18 | 5 | 240 | 1 | 1.67 |
| 3 | 6 | 6.6 | 292.5 | 7 | — |
| 4 | 1 | 3.0 | 175.5 | 1 | — |
| 5 | 6 | 6.8 | 234 | 1 | 0.32 |
| 6 | 1 | 8.3 | 280 | 1 | — |

The results are given in Table 8.

TABLE 8

| Test No. | Lead extraction % | Silver extraction % | Iron extraction % | Copper extraction % | Zinc extraction % |
| --- | --- | --- | --- | --- | --- |
| 1 | 99.1 | 99.5 | 52.6 | 62 | 40 |
| 2 | 99.3 | 99.9 | 4.0 | 56 | 40 |
| 3 | 96.1 | 97.4 | 0.2 | 3.4 | 7.1 |
| 4 | 99.6 | 98.0 | — | — | — |
| 5 | 99.5 | 97.6 | 2.5 | 74.5 | 20.9 |
| 6 | 99.6 | 96.4 | 5.6 | 51.4 | 36.6 |

It can be seen that in all cases lead and silver are leached with a yield above 96%. The copper is solubilized at the most by 74.5% and the zinc by 40%.

We claim:
1. A process for non-ferrous metals production from complex sulphide ores containing copper, lead, of zinc, silver and/or gold which comprises: grinding said ore and subjecting it to a flotation operation for obtaining a bulk concentrate of the non-ferrous metals minerals and for separating most of the pyrite as a flotation tail, slurrying said concentrate in water in such a way as to obtain a predetermined solid-liquid ratio and subjecting said slurry to an oxidation leach in a stirred pressure reactor, at an oxygen partial pressure in the range of from about 5 to 15 Kg/cm$^2$g and a temperature in the range of from about 150° to 250° C. for complete oxidation of metal sulphides to sulphates, separating the reaction mixture into a solid residue containing ferric oxide, lead sulphate and precious metals, and a leaching liquor containing sulphuric acid, copper sulphate and zinc sulphate, neutralizing the free sulphuric acid contained in said leaching liquor with grounded limestone to a final pH in the range of from about 1.5 to 2.5. removing precipitated gypsum from solution, recovering copper by cementation or solvent extraction and electrowinning, leaching lead, silver and gold from the said solid residue by a strong chloride solution containing calcium chloride at a temperature in the range of about 60° to 90° C. at a pH in the range of from about 7.0 to 1.0 and in the presence of about 1 gram per liter of ferric chlo- ride, recovering lead, silver and gold from the brine solution after solid removal by cementation with scrap zinc, mixing the lead free brine solution containing the zinc used in lead cementation with the zinc bearing solution from the copper recovery operation, and recovery zinc from the resulting solution by solvent extraction and electrowinning.

2. A process according to claim 1 wherein the ore grinding degree and the flotation scheme must be suitable to obtain a bulk flotation concentrate of the non-ferrous metals with a pyrite content below 30%.

3. A process according to claim 1 wherein the bulk flotation concentrate is slurried in water at a solid-liquid ratio such that the total iron in the solid to water ratio be lower than 20 Kg. per cubic meter.

4. A process according to claim 1 wherein the oxidation leach reaction of the bulk concentrate slurry in water is carried out at a temperature of $200° \pm 10°$ C.

5. A process according to claim 1 wherein the oxidation leach reaction of the bulk concentrate slurry in water is carried out at constant pressure with an oxygen partial pressure in the oxidizing gas higher than 5 $Kg/cm^2$.

6. A process according to claim 1 wherein the oxidation leach reaction of the bulk concentrate slurry in water is carried out under intense stirring conditions with dispersion of the oxidizing gas into the reacting slurry, in such a way as to create a gas-liquid interphase surface large enough to avoid oxygen disolution rate becoming controlling mechanism, in the overall oxidation kinetics.

7. A process according to claim 1 where in the conditions of the oxidation leach reaction of the bulk concentrate slurry in water are maintained constant not only until all the metal sulphides are oxizes to sulphates but also until all the ferric sulphate in solution is hydrolyzed to ferric oxide, which is achieved in a residence time equivalent to a reaction time in the range of from about 45 to 60 minutes.

8. A process according to claim 1 wherein the pregnant leaching solution containing copper and zinc, after solid-residue removal is neutralized with ground limestone, raising the pH to $2.0 \pm 0.2$, whereby gypsum is precipitated, washing and removing said gypsum by vacuum filtration, constituting a final solid residue of the process, and producing a clean liquor a pH 2.0 quite suitable to copper recovery either by cementation with scrap iron or by solvent extraction and electrowinning.

9. A process according to claim 1 wherein the strong chloride solution for leaching lead, silver and gold from the pressure leaching solid residue, is an aqueous solution containing NaCl at a concentration in the range of from about 200 to 300 grams per liter and $CaCl_2$ at a concentration corresponding to the stoichiometry of the lead to be leached.

10. A process according to claim 1 wherein the strong chloride solution for lead, silver and gold leaching is initially adjusted to a pH of 1.0 and 1 gram per liter of $FeCl_3$ is added to said solution.

11. A process according to claim 1 wherein leaching of lead, silver and gold from the pressure leaching solid residue with the strong chloride solution is carried out at a temperature of $85° \pm 5°$ C.

12. A process according to claim 1 wherein the conditions of the leaching of lead, silver and gold from the pressure leaching solid residue with the strong chloride solution, are maintained under mild stirring conditions for a residence time equivalent to a reaction time in the range of from about 15 to 40 minutes.

13. A process according to claim 1 wherein leaching of lead, silver and gold from the pressure leaching solid residue with the strong chloride solution is carried out at a solid-liquid ratio lower than the equivalent one to the maximum solubility of lead into said chloride solution.

14. A process according to claim 1 wherein the leaching chloride solution containing lead, silver and gold is separated from the ferric oxide solid residue by thickening and filtration at a temperature higher than 60° C., becoming a suitable solution for lead, silver and gold recovery by cementation with metallic zinc.

15. A process according to claim 1 wherein at least a portion of the strong chloride solution from lead, silver and gold cementation containing zinc is mixed with the zinc sulphate solution coming from copper recovery.

16. A process according to claim 15 wherein the chloride concentration in the resulting mixture must be adjusted to a value in the range of from about 30 to 70 grams per liter, reaching suitable conditions of feed material for zinc recovery by solvent extraction and electrowinning.

* * * * *